United States Patent
Waldorf et al.

(10) Patent No.: US 6,933,446 B1
(45) Date of Patent: Aug. 23, 2005

(54) ANTI-ROOSTING DEVICE

(75) Inventors: Philip M. Waldorf, Vernon, NJ (US); Sean Smith, Lake Hopatcong, NJ (US)

(73) Assignee: Bell Environmental Services, Parsippany, NJ (US)

( * ) Notice: Subject to any disclaimer, the term of this patent is extended or adjusted under 35 U.S.C. 154(b) by 11 days.

(21) Appl. No.: 10/780,600

(22) Filed: Feb. 19, 2004

(51) Int. Cl.[7] ............................................... H01B 7/08
(52) U.S. Cl. ................. 174/117 F; 174/128.1
(58) Field of Search .................. 174/128.1, 113 C, 174/131 A, 117 F, 115; 52/101; 43/112; 119/903

(56) References Cited

U.S. PATENT DOCUMENTS

| | | | |
|---|---|---|---|
| 817,448 A | 4/1906 | Shanahan | 817/448 |
| 2,647,228 A | 7/1953 | Just | 317/262 |
| 3,067,569 A * | 12/1962 | Kelley, Jr. | 57/242 |
| 3,291,897 A * | 12/1966 | Bramley | 174/126.1 |
| 3,294,893 A | 12/1966 | Shaffer | 174/70 |
| 3,366,854 A | 1/1968 | Robinson | 317/262 |
| 3,504,892 A * | 4/1970 | Crist | 256/10 |
| 3,717,802 A | 2/1973 | Plevy et al. | 317/262 S |
| 4,299,048 A | 11/1981 | Bayes | 43/98 |
| 4,861,645 A | 8/1989 | Standing | 428/196 |
| 4,861,947 A * | 8/1989 | Altermatt et al. | 174/113 C |
| 4,862,637 A | 9/1989 | Dressel | 43/98 |
| 5,031,353 A | 7/1991 | Gardiner | 43/98 |
| 5,036,166 A | 7/1991 | Monopoli | 174/128.1 |
| 5,095,646 A | 3/1992 | Bunkers | 43/98 |
| 5,255,896 A | 10/1993 | Letarte et al. | 256/10 |
| 5,497,585 A | 3/1996 | Engler | 52/101 |
| 5,570,537 A * | 11/1996 | Black et al. | 43/112 |
| 5,606,830 A | 3/1997 | Townsend, Jr. et al. | 52/101 |
| 5,713,160 A | 2/1998 | Heron | 52/101 |
| 5,850,808 A | 12/1998 | Burdick | 119/903 |
| 5,992,828 A | 11/1999 | Burdick | 256/10 |
| 6,006,698 A | 12/1999 | Negre | 119/537 |
| 6,283,064 B1 | 9/2001 | Djukastein et al. | 119/713 |
| 6,341,550 B1 | 1/2002 | White | 87/5 |
| 6,371,054 B1 | 4/2002 | Celata et al. | 119/712 |
| 6,472,602 B1 | 10/2002 | Pokrandt | 174/117 |
| 6,622,436 B1 | 9/2003 | Kretsch | 52/101 |
| 2002/0066895 A1 | 6/2002 | Wildschut | 256/10 |

FOREIGN PATENT DOCUMENTS

| | | | |
|---|---|---|---|
| EP | 1112686 | 4/2001 | A01M 29/00 |
| JP | 2000-050786 | 2/2000 | A01M 29/00 |

* cited by examiner

*Primary Examiner*—Chau N. Nguyen
(74) *Attorney, Agent, or Firm*—Swidler Berlin LLP

(57) ABSTRACT

An anti-roosting device is disclosed. The device includes a track, an electrical conductor, and an electrical source. The conductor is embedded within the track, with a portion of the conductor left exposed. The electrical source provides low amperage at high voltage to the electrical conductor such that the device is harmless to both birds and humans, but will deliver a shock that is effective in keeping birds from roosting thereon.

21 Claims, 1 Drawing Sheet

ANTI-ROOSTING DEVICE

BACKGROUND OF THE INVENTION

1. Field of the Invention

The present invention relates to a device for preventing birds and other pests from inhabiting and fouling an area. In particular, the present invention relates to an anti-roosting device.

2. Description of the Related Art

In many locations, the presence of birds is undesired, and even detrimental. For example, birds can interfere with the proper functioning of heating, cooling, and ventilation (HVAC) systems in commercial and residential buildings. The natural wastes associated with birds also frequently have adverse effects on people, equipment, and structures.

There are some known devices for preventing the roosting of birds in these areas. However, there is no known device that as effectively prevents the roosting of birds without detrimentally affecting the birds.

SUMMARY OF THE INVENTION

The present invention is related to an anti-roosting device to prevent birds from roosting near an object. The device includes a track, an electrical conductor, and an electrical source. The track is preferably elongate, sturdy, and flexible. The track may include one or more channels, in which one or more electrical conductors are embedded. A portion of the electrical conductors is left exposed, such that birds landing on the device will contact the electrical conductor. The channels are sized to snugly retain the conductors therein while leaving, preferably, approximately 1% to approximately 25% of the conductor exposed. A more preferred range of exposure is from approximately 10% to approximately 20%.

The channels are preferably substantially parallel to a longitudinal axis of the track. The track may have a flat side opposite the exposed electrical conductor(s) for facilitating attachment of the device to the object or area being protected. The track may be attached to the object by adhesive, such as glue or tape, between the object and the flat side. Mechanical fasteners, alone or in conjunction with the adhesive, may also be used. If mechanical fasteners are used, they are preferably connected through holes located in the track between the channels.

Each electrical conductor includes a plurality of wires around a rope. Preferably, the conductors include at least five wires around a rope. More preferably, the conductors include from five to ten wires around a rope, and most preferably the conductors include nine wires around a rope. The wires are electrically conductive, and the rope is not electrically conductive. The wires and rope may be braided, and are preferably circular in cross-section with substantially the same diameter. Preferred diameters are within the range of approximately 0.02 inch to approximately 0.03 inch, inclusive. The electrical conductors may be generally circular in cross-section and have a diameter of approximately 0.125 inch to approximately 0.175 inch.

The electrical source is operatively connected to the electrical conductor to provide electricity thereto. The electrical source is designed to provide low amperage at high voltage to the electrical conductor such that the device is harmless to both birds and humans, but will deliver a shock that is effective in keeping birds from roosting thereon. Preferred ranges include approximately 3 to approximately 6 amps at approximately 4000 to approximately 8000 volts. The electrical source may be either a direct current source or an alternate current source.

DESCRIPTION OF THE DRAWINGS

The present invention is described with reference to the accompanying drawings, in which like reference characters reference like elements, and wherein.

DETAILED DESCRIPTION OF THE INVENTION

Figure 1:
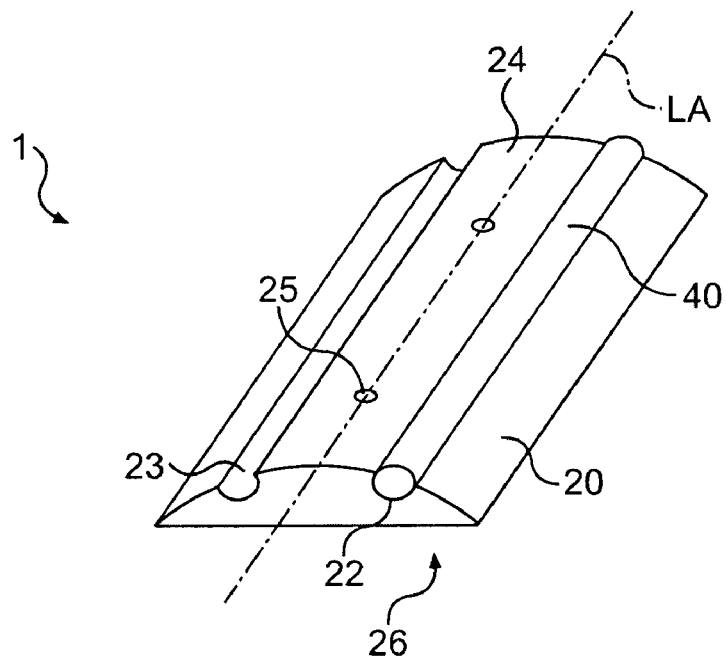
FIG. 1 shows an anti-roosting device according to the present invention.

FIG. 1 shows an anti-roosting device 1 according to the present invention. Device 1 includes an elongate track 20 and an electrical conductor 40. Track 20 is preferably comprised of a sturdy, flexible material. Furthermore, track 20 is preferably made of a non-conductive material. A preferred material for track 20 is polyethylene. Track 20 includes at least one channel 22 sized to at least partially embed electrical conductor 40 therein, while leaving a portion of conductor 40 exposed.

Figure 2:
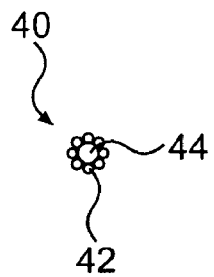
FIG. 2 shows a detailed, cross-sectional view of an electrical conductor of the anti-roosting device of FIG. 1.

FIG. 2 shows a detailed, cross-sectional view of electrical conductor 40. As illustrated, a preferred embodiment of conductor 40 includes a plurality of wires 42 around a rope 44. Wires 42 and rope 44 may be braided. Electrical conductor 40 preferably includes at least five wires 42 around rope 44, and more preferably from five to ten wires 42. A most preferred embodiment includes nine wires 42 around rope 44. Rope 44 is preferably made of a substantially nonconductive material, such as polyethylene, and wires 42 are made of a conductive material, such as tinned copper and stainless steel. Wires 42 and rope 44 are preferably circular in cross-section and may have substantially the same diameter. Preferred diameters are within the range of approximately 0.02 inch to approximately 0.03 inch, inclusive.

Electrical conductor 40 preferably is generally circular in cross-section and has a diameter of approximately 0.125 inch to approximately 0.175 inch. Channel 22 is sized to snugly retain conductor 40 therein while leaving a portion of conductor 40 exposed such that birds landing on device 1 will contact electrical conductor 40 and receive a shock. A preferred amount of exposure is from approximately 1% to approximately 25% of conductor 40, and a more preferred amount of exposure is from approximately 10% to approximately 20% of conductor 40. These percentages may be measured as a percentage of the outer surface area or outer diameter of conductor 40.

Device 1 preferably includes a second channel 23 for embedding a second electrical conductor 40. Channels 22, 23 are substantially parallel to a longitudinal axis LA of track 20. A region 24 of track 20 intermediate channels 22, 23 may define a plurality of holes 25 for facilitating attachment of device 1 to the object or area being protected. Track 20 also preferably includes a flat side 26 opposite exposed electrical conductor(s) 40 for facilitating attachment of device 1 to the object or area being protected.

Device 1 further includes an electrical source 50 operatively couple to electrical conductor 40. Electrical source 50 is designed to provide low amperage at high voltage to said electrical conductor such that device 1 is harmless to both birds and humans, but will deliver a shock that is effective in keeping birds from roosting thereon. Preferably, electrical source 50 provides approximately 3 to approximately 6 amps at approximately 4000 to approximately 8000 volts to said electrical conductor. Electrical source 50 may be either a direct current source or an alternate current source. Electrical source 50 may additionally include a combination of both direct current and alternate current components, which may be beneficial in providing a backup power source in the event of a loss of power.

Figure 3:
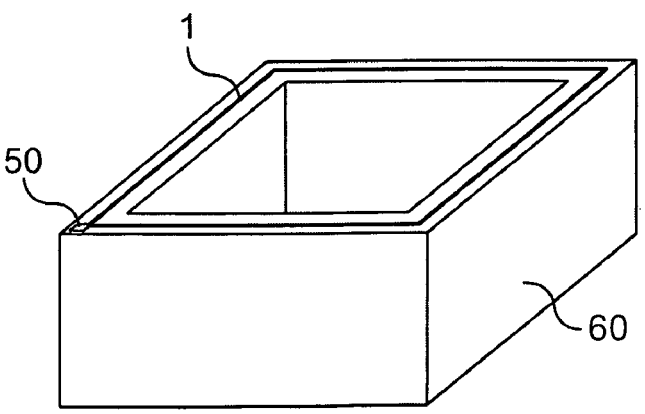
FIG. 3 shows the anti-roosting device of FIG. 1 in use.

FIG. 3 shows anti-roosting device 1 attached to an object 60 to prevent birds from roosting thereon. Object 60 may be anything or any area around which bird presence is undesired, such as ledge, duct, or parapet. Track 20 is coupled to object 60 around the area to be protected. Track 20 may be coupled by adhesive, such as glue or tape, between object 60 and flat side 26. Mechanical fasteners, alone or in conjunction with the adhesive, may also be used to couple device 1 to object 60. If mechanical fasteners are used, they are preferably connected through holes 25. Electrical source 50 is operatively coupled to electrical conductor 40, and a current is provided to prevent birds from roosting on object 60.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the invention has been described above in terms of preventing birds from roosting, it may equally be used to prevent other unwanted animals from roosting or inhabiting around the object or area being protected. Thus, the present invention should not be limited by the above-described exemplary embodiments, but should be defined only in accordance with the following claims and their equivalents.

What is claimed is:

1. An anti-roosting device, comprising:
   an elongate track;
   an electrical conductor at least partially embedded within said track, said electrical conductor including a plurality of wires around a rope; and
   an electrical source operatively coupled to said electrical conductors;
   wherein said track includes a substantially flat mounting surface extending substantially along a width said track; and
   wherein said track further includes an arcuate surface opposite said mounting surface, said electrical conductor being embedded within said arcuate surface.

2. The anti-roosting device of claim 1, wherein said electrical conductor includes at least five wires around a rope.

3. The anti-roosting device of claim 2, wherein said rope is comprised of a substantially nonconductive material.

4. The anti-roosting device of claim 2, wherein said electrical conductor includes from five to ten wires around a rope.

5. The anti-roosting device of claim 4, wherein said electrical conductor includes nine wires around a rope.

6. The anti-roosting device of claim 1, wherein said electrical conductor is generally circular in cross-section and has a diameter of approximately 0.125 inch to approximately 0.175 inch.

7. The anti-roosting device of claim 1, wherein said track includes a channel sized to substantially embed said electrical conductor while leaving a portion thereof exposed.

8. The anti-roosting device of claim 7, wherein said channel is sized to leave from approximately 1% to approximately 25% of said electrical conductor exposed.

9. The anti-roosting device of claim 8, wherein said channel is sized to leave from approximately 10% to approximately 20% of said electrical conductor exposed.

10. The anti-roosting device of claim 7, wherein said track includes a second channel sized to substantially embed a second electrical conductor while leaving a portion thereof exposed.

11. The anti-roosting device of claim 10, wherein said channels are substantially parallel to a longitudinal axis of said track.

12. The anti-roosting device of claim 11, wherein said track defines a plurality of holes between said channels for facilitating attachment of the device to an object.

13. The anti-roosting device of claim 1, further comprising a second electrical conductor embedded within said track, said second electrical conductor including a plurality of wires around a rope.

14. The anti-roosting device of claim 1, wherein said electrical source is designed to provide low amperage at high voltage to said electrical conductor.

15. The anti-roosting device of claim 14, wherein said electrical source provides approximately 3 to approximately 6 amps at approximately 4000 to approximately 8000 volts to said electrical conductor.

16. The anti-roosting device of claim 1, wherein said electrical source is a direct current source.

17. The anti-roosting device of claim 1, wherein said electrical source is an alternate current source.

18. The anti-roosting device of claim 1, wherein said track is substantially unitary.

19. An anti-roosting device, comprising:
    an elongate track;
    a first electrical conductor at least partially embedded within said track, said first electrical conductor including a plurality of wires around a rope;
    second electrical conductor at least partially embedded within an upper surface of said track; and
    an electrical source operatively coupled to said first and second electrical conductors;
    wherein said track includes a flat mounting surface opposite said upper surface, said flat mounting surface extending at least underneath said first and second electrical conductors.

20. An anti-roosting device, comprising:
    an elongate track;
    an electrical conductor at least partially embedded within said track, said electrical conductor including a plurality of wires around a rope; and
    an electrical source operatively coupled to said electrical conductor;
    wherein said track contains a mounting surface that is designed to eliminate air gaps between said track and a surface upon which the device is mounted.

21. The anti-roosting device of claim 20, wherein:
    said track has a width; and
    said mounting surface is substantially flat and extends along a majority of said width.

* * * * *